US010049315B2

United States Patent
Chatterton et al.

(10) Patent No.: US 10,049,315 B2
(45) Date of Patent: Aug. 14, 2018

(54) ANTI-SKIMMING PAYMENT CARD

(71) Applicant: PAYPAL, INC., San Jose, CA (US)

(72) Inventors: Geoffrey W. Chatterton, Santa Clara, CA (US); Anupam Pahuja, Singapore (SG)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/243,151

(22) Filed: Aug. 22, 2016

(65) Prior Publication Data

US 2016/0358059 A1 Dec. 8, 2016

Related U.S. Application Data

(63) Continuation of application No. 14/566,479, filed on Dec. 10, 2014, now Pat. No. 9,430,730.

(51) Int. Cl.
| | |
|---|---|
| G06K 5/00 | (2006.01) |
| G06K 19/06 | (2006.01) |
| G06K 19/073 | (2006.01) |
| G06F 21/62 | (2013.01) |
| G06Q 20/34 | (2012.01) |
| G06F 21/77 | (2013.01) |
| G07F 19/00 | (2006.01) |
| G07F 7/08 | (2006.01) |
| G06K 7/08 | (2006.01) |
| G06Q 20/32 | (2012.01) |
| G06Q 20/40 | (2012.01) |
| G06F 21/32 | (2013.01) |

(52) U.S. Cl.
CPC ... *G06K 19/06206* (2013.01); *G06F 21/6245* (2013.01); *G06F 21/77* (2013.01); *G06K 7/087* (2013.01); *G06K 19/07309* (2013.01); *G06K 19/07372* (2013.01); *G06K 19/07381* (2013.01); *G06Q 20/3278* (2013.01); *G06Q 20/34* (2013.01); *G06Q 20/4016* (2013.01); *G06Q 20/40145* (2013.01); *G07F 7/0813* (2013.01); *G07F 19/2055* (2013.01); *G06F 21/32* (2013.01)

(58) Field of Classification Search
USPC ................ 235/375, 380, 449, 451, 492, 493
See application file for complete search history.

(56) References Cited

U.S. PATENT DOCUMENTS

| | | | |
|---|---|---|---|
| 5,386,104 A * | 1/1995 | Sime ........................ | G06K 9/00 235/379 |
| 6,079,621 A | 6/2000 | Vardanyan et al. | |
| 7,896,251 B2 | 3/2011 | Yamaguchi et al. | |
| 2002/0047049 A1 | 4/2002 | Perron et al. | |
| (Continued) | | | |

*Primary Examiner* — Tuyen K Vo
(74) *Attorney, Agent, or Firm* — Haynes & Boone, LLP

(57) ABSTRACT

A payment card may include a read sensor configured to detect a reading of the payment card by a card reader. In particular, the payment card may include a controller or a processor configured to count a number of times the payment card is read by other card readers. The payment card may implement card security measures based on the number of reads detected by the read sensor. The payment card may further include a magnetic stripe emulator configured to emulate signal patterns of a magnetic stripe when the magnetic stripe is read by a card reader. The controller may disable the magnetic stripe emulator when the number of reads detected by the read sensor exceeds a predetermined number.

20 Claims, 4 Drawing Sheets

(56) References Cited

U.S. PATENT DOCUMENTS

| | | | |
|---|---|---|---|
| 2006/0032906 A1* | 2/2006 | Sines | G06K 19/06187 |
| | | | 235/380 |
| 2008/0056544 A1* | 3/2008 | Aikawa | G06K 9/00885 |
| | | | 382/124 |
| 2009/0145964 A1 | 6/2009 | Blythe | |
| 2009/0145972 A1* | 6/2009 | Evans | G06Q 20/341 |
| | | | 235/492 |
| 2009/0159713 A1 | 6/2009 | Mullen et al. | |
| 2011/0174874 A1 | 7/2011 | Poznansky et al. | |
| 2012/0143754 A1 | 6/2012 | Patel | |
| 2012/0235958 A1 | 9/2012 | Chen | |
| 2013/0065564 A1* | 3/2013 | Conner | G06K 19/0718 |
| | | | 455/414.1 |
| 2013/0200999 A1* | 8/2013 | Spodak | G05B 1/01 |
| | | | 340/5.65 |
| 2013/0207786 A1* | 8/2013 | Hutzler | G06K 9/00892 |
| | | | 340/10.51 |
| 2013/0297503 A1 | 11/2013 | McGowan | |
| 2013/0320080 A1 | 12/2013 | Olson et al. | |

\* cited by examiner

ANTI-SKIMMING PAYMENT CARD

CROSS-REFERENCE TO RELATED APPLICATIONS

This application is a continuation application of U.S. patent application Ser. No. 14/566,479, filed Dec. 10, 2014, now allowed and to be issued as U.S. Pat. No. 9,430,730 on Aug. 30, 2016, the entire contents of which are herein incorporated by reference.

BACKGROUND

Field of the Invention

The present invention generally relates to a payment card, and in particular, to a payment card with anti-skimming functions and features.

Related Art

Payment cards, such as credit cards or debit cards, have been used widely by consumers to make payments at various merchants. During a payment process at a merchant, the merchant typically reads a customer's payment card by swiping the payment card at a card reader. The card reader reads the magnetic stripe on the payment card to receive information about the payment card. Card skimming is the fraudulent practice of obtaining the card information of a payment card by swiping the payment card at an illegitimate card reader without the card owner's consent or authorization. Card skimming typically occurs in the absence of the customer, such as when a merchant takes the payment card away from the customer to process payment. The merchant or an employee of the merchant may first swipe the payment card at a legitimate card reader to process the legitimate payment authorized by the customer and then perform an additional swipe at an illegitimate card reader to skim the card information from the payment card. The skimmed card information may then be collected and used for fraudulent transactions in the future. Thus, there is a need for a device, system, and method that prevents such card skimming practices.

Figure 1:
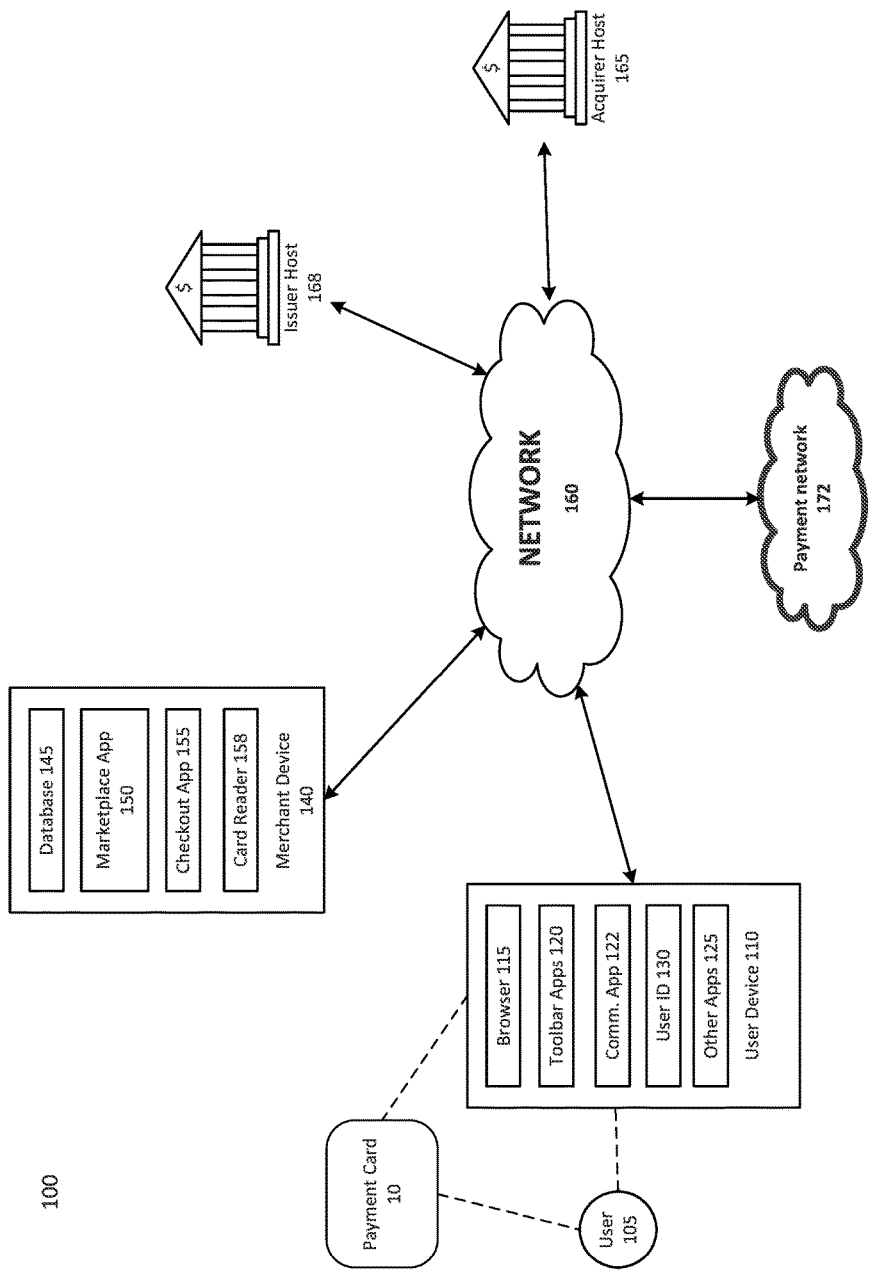
FIG. 1 is a block diagram of a networked system suitable for implementing an anti-skimming payment card according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a payment card may include a read sensor configured to detect a reading of the payment card by a card reader. In particular, the payment card may include a controller or a processor configured to count a number of times the payment card is read by card readers. The payment card may implement card security measures based on the number of reads detected by the read sensor.

In an embodiment, the payment card may include a magnetic stripe emulator configured to emulate signal patterns of a magnetic stripe of a typical payment card when the magnetic stripe is read by a card reader. The payment card's controller may be configured to control the magnetic stripe emulator to emulate one or more other payment cards based on a user's selection. The controller may disable the magnetic stripe emulator when the number of reads detected by the read sensor exceeds a predetermined number. The number of reads may vary depending on different factors, such as time, location, merchant, etc. In an embodiment, the controller may select a different payment card for the magnetic stripe emulator to emulate based on the number of reads detected by the read sensor.

In an embodiment, the payment card may include an authentication device, such as a fingerprint scanner or an input device for the user to input passwords or PINs. The controller may require user authentication, such as scan fingerprint or input PIN, to activate or enable the payment card. The controller may require re-authentication based on the number of reads detected by the read sensor. For example, each successful authentication may allow one swipe or one reading. After one swipe or one reading, the controller may disable the payment card and may require another user authentication before enabling the payment card again, which can be from user entry of authentication information or a detection that the card is back in the user's possession, such as based on location of the card relative to the user and/or the user device.

In an embodiment, the payment card may include a display, such as an electrophoretic ink display or an LED display, configured to display card information to the user. The controller may control the display to present card information, such as the status of the payment card (enabled or disabled), the payment account or payment card which the magnetic stripe emulator is emulating, the number of reads, and the like. The display also may provide information or instructions to users on how to use the card. For example, when the payment card is disabled, the display for present information to the user on why the payment card is disabled and how to enable the payment card again, e.g., by fingerprint scanning.

In an embodiment, the payment card may include a communication device, such as a Bluetooth communication module, Bluetooth Low Energy (BLE) module, Near-Field Communication (NFC) module, or other wireless communication modules. The payment card may communicate wirelessly with a user device, such as user's mobile device. Thus, the payment card may be controlled or set up via the user device. Notifications from the payment card may be displayed at the user device. Further, various functions of the payment card may be implemented via the user device.

In an embodiment, the controller may implement security settings based on a number of reads detected at the read sensor. For example, the controller may disable or enable the payment card based on the number of reads detected. In another example, the controller may select different payment card profiles to emulate based on the number of reads detected. In still another example, the controller may notify the user, the related bank, the payment network, and/or the payment service provider regarding the number of reads or any violation on read limits. In yet another example, the controller may implement different levels of user authentication based on the number of reads. Thus, by detecting the number of reads, various security measures may be implemented to prevent fraudulent card skimming activities.

FIG. 1 is a block diagram of a networked system 100 suitable for implementing anti-skimming payment cards according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant device 140, an issuer host 168, an acquirer host 165, and a payment network 172 in communication over a network 160. System 100 also may include a payment card 10 associated with the user 105. In one embodiment, the payment card 10 may be connected wirelessly to the user device 110. A user 105, such as a consumer, utilizes payment card 10 to perform payment transactions at the merchant. The merchant may scan or swipe the payment card 10 using a card scanner or card reader to initiate a payment transaction. Although only one merchant device is shown, a plurality of merchant devices may be utilized if the user is purchasing products or services from multiple merchants.

User device 110, merchant device 140, and payment card 10 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, wearable device, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise communicate and receive information about card swipes as discussed herein. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. User device 110 may include a short range wireless communication device, such as a Bluetooth device, a Bluetooth Low Energy (BLE) module, a Near-Field Communication (NFC), WiFi communication module, and the like. For example, user device 110 may communicate with the payment card 10 wirelessly.

Payment network 172 may be operated by payment card service providers or card associations, such as VISA, MASTERCARD, AMERICAN EXPRESS. The payment card service providers may provide services, standards, rules, and/or policies for issuing various payment cards. A network of communication devices, servers, and the like also may be established to communicate payment related information among the different parties of a payment transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at various merchants who agreed to accept the payment card.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Merchant device 140 may be maintained, for example, by a merchant or seller offering various products and/or services. The merchant may have a physical point-of-sale (POS) store front. Merchant device 140 may be used for POS or online purchases and transactions. Generally, merchant device 140 may be maintained by anyone or any entity that receives money, which includes charities as well as banks, retailers, Automatic Teller Machines (ATM), or provides services and/or items to a user.

Merchant device 140 may include a database 145 identifying available products (including digital goods) and/or services (e.g., collectively referred to as items) which may be made available for viewing and purchase by user 105. Accordingly, merchant device 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant device 140 also may include a checkout application 155 which may be configured to facilitate the purchase by user 105 of goods or services online or at a physical POS or store front. Checkout application 155 may be configured to accept payment information from or on behalf of user 105 through a payment service provider, such as PayPal Inc, over network 160. For example, checkout application 155 may receive and process a payment confirmation from the payment service provider server, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Merchant device 140 may also include a card reader 158 configured to read a payment card. The card reader 158 may include a magnetic stripe reader configured to read a magnetic stripe of a payment card as the payment card is swiped through the card reader 158. For example, the magnetic stripe reader may include a magnetic head configured to sense the polarity of various magnetic bars passing through the magnetic stripe reader to capture the code embedded in the payment card. As such, the merchant device 140 may accept various types of payment cards from customers as a form of payment at the merchant.

Figure 2A:
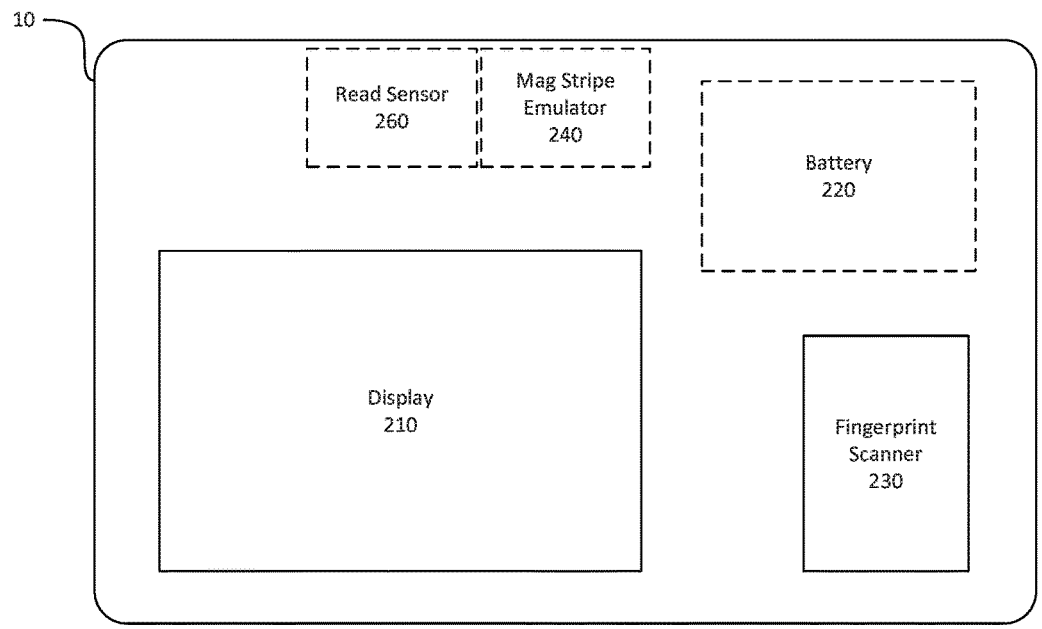
FIG. 2A is a schematic diagram of a payment card according to one embodiment.

FIG. 2A is a schematic diagram of a payment card 10 according to one embodiment. The payment card 10 may have a size and a shape similar to conventional payment cards, such as ATM cards, credit cards, debit cards, etc. For example, the payment card 10 may have the size and shape conforming to the ISO/IEC 7810 ID-1 standard at approximately 85.60×53.98 mm with a thickness of about 0.76-0.85 mm and has rounded corners with a radius of 2.88-3.48 mm. The payment card 10 may include a display 210 at a front side and configured to display information related to the payment card 10 to the user 105. The display 210 may be an electrophoretic ink display or an LED display configured to be embedded and accommodated within the payment card 10. In an embodiment, the display 210 may be a touch screen configured to receive user input. In an embodiment, the display 210 may be an LED indicator configured to emit different colors of light, or a series of LEDs configured to indicate the number of times the payment card 10 has been read. In other embodiments, the display 210 may be excluded.

The payment card 10 may include a fingerprint scanner 230 at the front side. The fingerprint scanner 230 may be configured to scan a user's fingerprint to authenticate the user. The fingerprint scanner 230 may include one or more of an optical type sensor, capacitive type sensor, and ultrasonic type sensor. In an embodiment, an input device, such as touch screen, buttons, and the like, may be provided to receive the user 105's input for user authentication. For example, the user 105 may enter a password, a PIN, a key, and the like to access or enable the payment card 10. In other embodiments, the fingerprint scanner 230 may be excluded or replaced/included with other authentication means, such as a PIN or password entry means (e.g., keypad, PIN pad, microphone, retina scanner, etc.).

A battery 220, if needed, may be embedded in the payment card 10, as shown in a dashed line area. The battery 220 is configured to provide electric power to the various components in the payment card 10, such as the display 210, the fingerprint scanner 230, etc. The battery 220 may be a rechargeable battery. In an embodiment, the battery 220 may be charged wirelessly by at a wireless charging station or charging pad. For example, the battery 220 may be charged while the payment card 10 is placed on a charging pad or charging station via inductive charging without being plugged in.

A magnetic stripe emulator 240 and a read sensor 260 also may be provided in the payment card 10. The read sensor 260 is configured to detect a reading of the payment card 240 by a card reader. The read sensor 260 may include a magnetic field sensor, such as a Hall-effect sensor or a solenoid. As such, the read sensor 260 may detect a presence and movement of a magnetic head of a card reader when the payment card 10 is swiped at the card reader.

The magnetic stripe emulator 240 is configured to emulate the magnetic stripe of conventional payment card when the payment card 10 is swiped and read by a card reader. In particular, the magnetic stripe emulator 240 may include a solenoid configured to emit a sequence of magnetic signal mimicking the magnetic signal of a magnetic stripe when the payment card 10 is swiped through a card reader. A current generator may be used to generate and feed pulses of currents through the solenoid to generate particular patterns of magnetic signals. For example, a sequence of electrical current pulses may be fed through the solenoid of the magnetic stripe emulator 240 to generate a particular sequence of magnetic signals. By varying the sequence of current pulses, the magnetic stripe emulator 240 may emulate the magnetic stripes of different payment cards. In an embodiment, the magnetic stripe emulator 240 and the read sensor 260 may be implemented as one unit. In another embodiment, the magnetic stripe emulator 240 may be implemented as a separate unit.

Figure 2B:
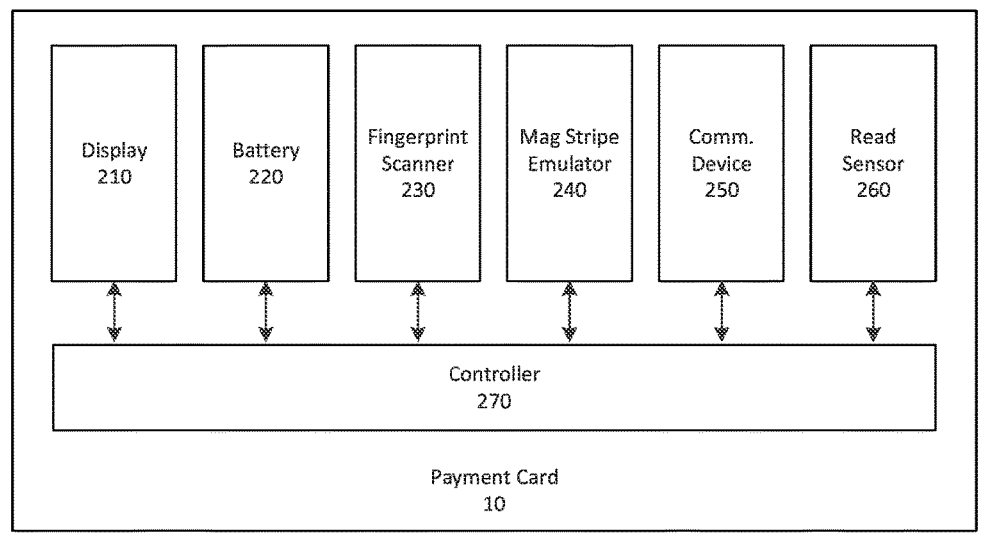
FIG. 2B is a functional block diagram of a payment card according to one embodiment.

FIG. 2B is a functional block diagram of a payment card according to one embodiment. The payment card 10 further may include a controller 270. The controller 270 may include one or more of a microprocessor and an integrated circuit, such as an Application Specific Integrated Circuit (ASIC). The controller 270 may be provided on a printed circuit board embedded in the payment card 10. The controller 270 may include memories and processors configured to store and execute programs and applications to control the operations of various components of the payment card 10.

The payment card 10 also may include a communication device 250. The communication device 250 may include one or more of a Bluetooth communication module, a Bluetooth Low Energy (BLE) module, a Near-Field Communication (NFC) module, a WiFi communication module, and the like. As such, the payment card 10 may communicate with user device 110 or other devices via the communication device 250.

In some embodiments, the payment card 10 may be a simple payment card with one or more fixed or preset card numbers and including the read sensor 260. For example, the simple payment card may have one card number or have two card numbers that are selectable by the user 105. The simple payment card may have the read sensor 260 and a conventional magnetic stripe. The controller 270 may provide indication to the user 105, such as by an LED light (red or green), that additional swipes have been performed on the payment card.

Figure 3:
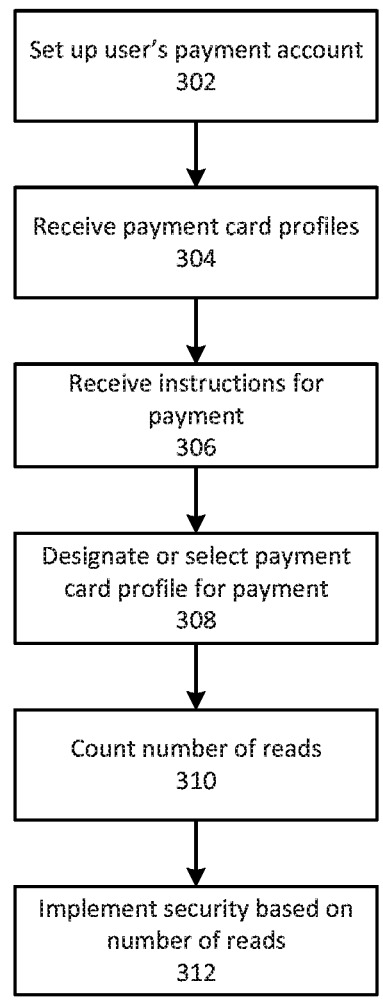
FIG. 3 is a flowchart showing a process for implementing an anti-skimming payment card according to one embodiment.

FIG. 3 is a flowchart showing a process for implementing an anti-skimming payment card according to one embodiment. At step 302, the user 105 may set up a payment account through the payment card 10, at the user device 110, or at a payment service provider via the user device 110. The payment account may include the user 105's information, such as name, address, contact information, funding sources, financial information, social security number, user name, password, and/or other personal information. The user 105 may enter the information through the payment card 10 or the user device 110. In an embodiment, the user 105 may download a payment application at the user device 110 to manage the payment account.

At step 304, the payment card 10 may receive payment card profiles. The user 105 may have one or more payment card accounts from different banks, such as various credit card accounts, debit card accounts, and the like. Each payment card profile may include the payment card number, the expiration date, the name on the payment card, the card security code, name of the payment network, such as VISA, MASTERCARD, AMERICAN EXPRESS, and the like, billing address, billing zip code, and other information. As noted above, the user 105 may have more than one payment card. Each payment card may have a payment card profile. The user 105 may select payment cards that the user 105 wishes to be incorporated into the payment card 10 to be emulated by the payment card 10.

The user 105 may enter the payment card profiles through the payment card 10 or the user device 110. For example, the user 105 may enter the payment card profiles by operating a touch screen or input device at the payment card 10. In another example, the user 105 may enter the payment card profiles at the user device 110 and the user device 110 may upload the payment card profiles to the payment card 10 via wired or wireless communication, such as Bluetooth or BLE communication. In still another example, the user device 110 may include a camera or scanner that may capture an image of the payment cards. The user device 110 may analyze the image to extract the payment card information from the image of the payment cards by optical character recognition technique. As such, the user 105 need not type or input the payment card information manually. This may provide additional convenience to the user 105.

Each payment card profile also may include settings on how a payment card should be used or emulated by the payment card 10 for payment transactions. For example, the user 105 may designate certain payment cards for use at certain merchants. In another example, the user 105 may designate certain payment cards for use at certain time, day, location, country, situation, merchant, and the like.

In an embodiment, the user 105 may set a payment card profile as the default or primary payment card profile which the payment card 10 would emulate by default for payment transactions unless the user 105 indicates otherwise. The user 105 also may set one or more secondary payment card profiles when the default or primary payment card profile is not activated or is not accepted for a payment transaction.

In an embodiment, the user 105 may set limits on the number of reads or swipes for the payment card 10. The limits on the number of reads may be designated for different locations, such as different countries, cities, or merchant stores, different times, such as seasons, weekends, week days, and time. In an embodiment, the limits on the number of reads may be designated for different connection statuses of the payment card 10. For example, the payment card 10 may be allowed unlimited number of swipes when the payment card 10 is connected to the user device 110 via BLE, indicating that the payment card 10 is in the presence of the user 105. The payment card 10 may be limited to one swipe when the payment card 10 is disconnected from the user device 110, indicating that the payment card 10 has departed from the presence of the user 105. This may prevent others from skimming the payment card 10 with additional swipes when the payment card 10 is not in the user 105's presence.

In an embodiment, the user 105 may set the security measures that may be implemented when the payment card 10 exceeds the swiping limit. For example, the payment card 10 may be disabled or rendered unreadable when the swiping limit is reached. The payment card 10 may require user authentication to be enabled. In another example, the payment card 10 may allow the above-limit swipe, but may notify the user 105 with regard to the additional swipe later. The payment card 10 may send a request to the user device to approve an additional swipe over the swiping limit. In an embodiment, the payment card 10 may switch to another payment card profile when the swipe limit is exceeded. For example, the payment card 10 may use a payment card profile that has better security safeguards for the above-limit swipe to protect the user 105 from potential fraudulent charges.

After the user 105 has uploaded the payment card profiles into the payment card 10 and designated various payment settings for the payment card 10, the payment card 10 is ready to be used for payment transactions. At step 306, the payment card 10 may receive instructions for payment. When the user 105 is ready to use the payment card 10 to make a payment, the user 105 may take the payment card 10 out and may swipe the payment card 10 at a merchant's card reader. In an embodiment, the user 105 may provide the payment card 10 to an employee of the merchant, such as at a restaurant, and the employee may leave with the payment card 10 to process payment.

Before swiping the card, the user 105 may select a payment card profile to use for the payment transaction. For example, the user 105 may select one payment card profile from a plurality of credit cards and debit cards that previously were uploaded into the payment card 10. The user 105 also may designate security measures before providing the payment card 10 to others for payment. For example, the user 105 may set a swipe limit on the payment card 10 for the specific current payment transaction. In an embodiment, the payment card selection and the security settings may have been set previously by the user 105. For example, based on the location of the user 105 detected by the user device 110 and/or the connection status of the payment card 10, the payment card 10 may automatically select a particular payment card to use and the security settings for the payment transaction.

At step 308, the payment card 10 may select the payment card profile to emulate. The controller 270 may receive the payment card profile selection via an input device, such as a touch screen, at the payment card 10 or via the communication device 250 from the user device 110. The controller 270 may then retrieve the selected payment card profile. The controller 270 may generate a set of current signals to emulate the selected payment card based on the payment card's number, expiration date, name, service code, and the like. The controller 270 also may check the security settings related to the selected payment card profile to determine whether additional security requirements are needed before using the payment card profile. For example, the selected payment card profile may require user authentication, such as fingerprint scanning or PIN entry, before the selected payment card can be emulated or used at payment card 10. In another example, the selected payment card profile may have a swipe limit on how many times the payment card can be read or swiped.

The controller 270 may control the display 210 to display the name, logo, or picture of the currently selected payment card profile to show the user 105 which payment card is currently being used for payment at the payment card 10. The controller 270 also may display additional information, such as a swipe limit, security requirements for using the card, and the like. After a payment card profile is properly selected and the selected payment card is activated to be used through the payment card 10, the payment card 10 may detect and count the number of reads or swipes at step 310. The read sensor 260 at the payment card 10 may detect or sense a presence and movement of a magnetic head of a card reader when the payment card 10 is swiped and read at the card reader. The read sensor 260 may generate and send a signal to the controller 270 each time the read sensor 260 detects the magnetic head of the card reader. The controller 270 may count the number of times the payment card 10 is read or swiped by card readers.

At step 312, the payment card 10 may implement security measures based on the number reads detected by the read sensor 260. If the number of reads detected is less than the limit, the payment card 10 may emulate the selected payment card when swiped. For example, when the read sensor 260 detects that the payment card 10 is in the process of being swiped by a card reader, the controller 270 may control the magnetic stripe emulator 240 to emulate the magnetic stripe of the selected payment card by emitting a similar magnetic signal when the payment card 10 passes through the card reader. As such, the card reader may receive the magnetic signal embedded with the card information of the selected payment card, such as card number, name, expiration date, security code, and the like. The card reader may relay the card information to the payment network for payment processing.

If the number of reads detected by the read sensor 260 is equal to or exceeded the limit, the controller 270 may implement security measures as designated by the user. In an embodiment, the controller 270 may disable the magnetic strip emulator 240, such that the payment card 10 can no longer be used for payment. Thus, even if the payment card 10 is swiped at a card reader, no signal is emitted to the card reader. The controller 270 also may control the display 210 to indicate that the payment card 10 is temporarily disabled and provide instructions on how to enable it. For example, the display 210 may display a message: "Payment card disabled. Please return to card owner who may activate the payment card." Thus, the payment card 10 may be returned to the user 105 and the user 105 may re-enable the payment card 10 by entering a PIN or by fingerprint scanning. In another embodiment, the payment card 10 may be re-enabled upon detection that the card is back in the user's possession, such as co-located with the user device (e.g., smart phone or other wearable), in communication with the user device, etc.

In an embodiment, the payment card 10 may allow the additional swipe exceeding the limit. The payment card 10 may later notify the user 105 of the additional swipe at the user device 110 when the payment card 10 is brought back to the user 105 and the payment card 10 is again connected to the user device 110. For example, a message: "The payment card was swiped three times, which is two times above the limit" may be displayed to the user 105 at the user device 110. As such, the user 105 may be notified to take necessary measures. In an embodiment, the payment card 10 may record the time, date, and location of each swipe to establish a swipe history. As such, when there is a security breach in a payment card account, the user 105 may back track to find out where the card skimming activity may have occurred. In another embodiment, when the swipe limit has been reached or exceeded, the user may be notified, such as through the user's device, and be allowed to authorize additional swipe(s), such as by returning an authorization through text, email, or the like. This can include entering a password or PIN into the user device.

In an embodiment, the payment card 10 may have different security settings for different locations and/or different connection status. In particular, the payment card 10 may have different security settings based on a combination of other user devices connected to the payment card 10. For example, the payment card 10 may allow unlimited number of swipes if the payment card 10 is connected to two or more of the user 105's devices, such as mobile devices and/or wearable devices. The payment card 10 may allow unlimited number of swipes after user authentication at the payment card 10, such as by fingerprint scanning or PIN entry, when the payment card 10 is connected to a user device. The payment card 10 may allow only one swipe after the payment card 10 is disconnected from the user device 110 indicating that the payment card 10 has departed from the user 105's presence.

In an embodiment, the payment card 10 may detect location or receive location information from the user device 110 and may implement security settings based on the location information. For example, the payment card 10 may allow unlimited swipes when the user 110 is at a merchant trusted by the user 110 or a merchant that the user 110 frequently visits. The payment card 10 may require user authentication for each swipe when the user 110 is in a new location.

In an embodiment, the payment card 10 may select a payment card profile to use based on the number of swipes detected by the read sensor 260. For example, the payment card 10 may allow one swipe with the primary payment card, which provides the user 110 with more reward benefits. The primary payment card may have lower security protection. As such, for subsequent swipes, the payment card 10 may switch to a secondary payment card which provides more security protection, but has lower reward benefits.

In an embodiment, the payment card 10 may detect the type of card reader based on the pattern of magnetic signals detected at the read sensor 260. For example, if the read sensor 260 detects a relative fast movement or passing of a magnetic head of a card reader, the controller 270 may determine that the payment card 10 is being swiped at a typical POS card reader. If the read sensor 260 detects a slow and steady movement of a magnetic head of a card reader and the read sensor 260 is read two times in opposite directions, the controller 270 may determine that the payment card 10 is being used at an automated machine, such as an ATM machine. Thus, the controller 270 may adjust the read count accordingly. For example, two reads at an ATM machine may be counted as one reading, even though payment card 10 passes the card reader twice, once for being inserted into the machine and once for exiting the machine after the transaction.

In an embodiment, the payment card 10 may detect the pattern of swiping motion to learn the user 110's swiping signature. As such, the controller 270 may determine whether the payment card 10 is swiped by the user 110 or by others. The controller 270 may implement security measures based on the swiping motion detected by the read sensor 260. For example, the controller 270 may allow a higher swiping limit without user authentication when the swiping motion resembles that of the user 110. The controller 270 may have a lower swiping limit and may require user authentication when the swiping motion does not resemble that of the user 110.

In an embodiment, the payment card 10 may generate and embed security information in the signals generated at the magnetic stripe emulator 240 based on the number of swipes detected. For example, when the payment card 10 has exceeded the limit number of swipes, the payment card 10 may add a flap or a security code in the emulated magnetic stripe signal to indicate to the merchant, the issuer/acquirer bank, the payment network and/or a payment service provider that the payment transaction has an elevated risk of being compromised. Thus, the related financial or payment service providers may take additional pre-caution in processing such transactions.

In an embodiment, the payment card 10 may delay magnetic emulator 240 to emulate a magnetic stripe after each scan or each swipe. This may prevent the fraudulent practice in which false ATM fronts are installed over real units. When a false front is installed at an ATM machine, the payment card may be scanned by the false front before entering the real ATM machine. Thus, by adding some delay, such as a 10 second delay, between magnetic stripe emulations, the payment card 10 may prevent the false front from reading the payment card. Although the false front may read the payment card, the ATM would not be able to, and the user may be alerted to the potential for theft of the payment card and thus avoid giving up their PIN, because the real ATM machine would reject and return the card as unreadable.

In an embodiment, the payment card 10 may include a conventional magnetic stripe, a magnetic stripe masking device, and the read sensor 260. When a skimming event is detected, the payment card 10 may be locked out for certain period of time during which the magnetic stripe masking device may generate noise to mask the signals of the conventional magnetic stripe when read by a card reader.

Figure 4:
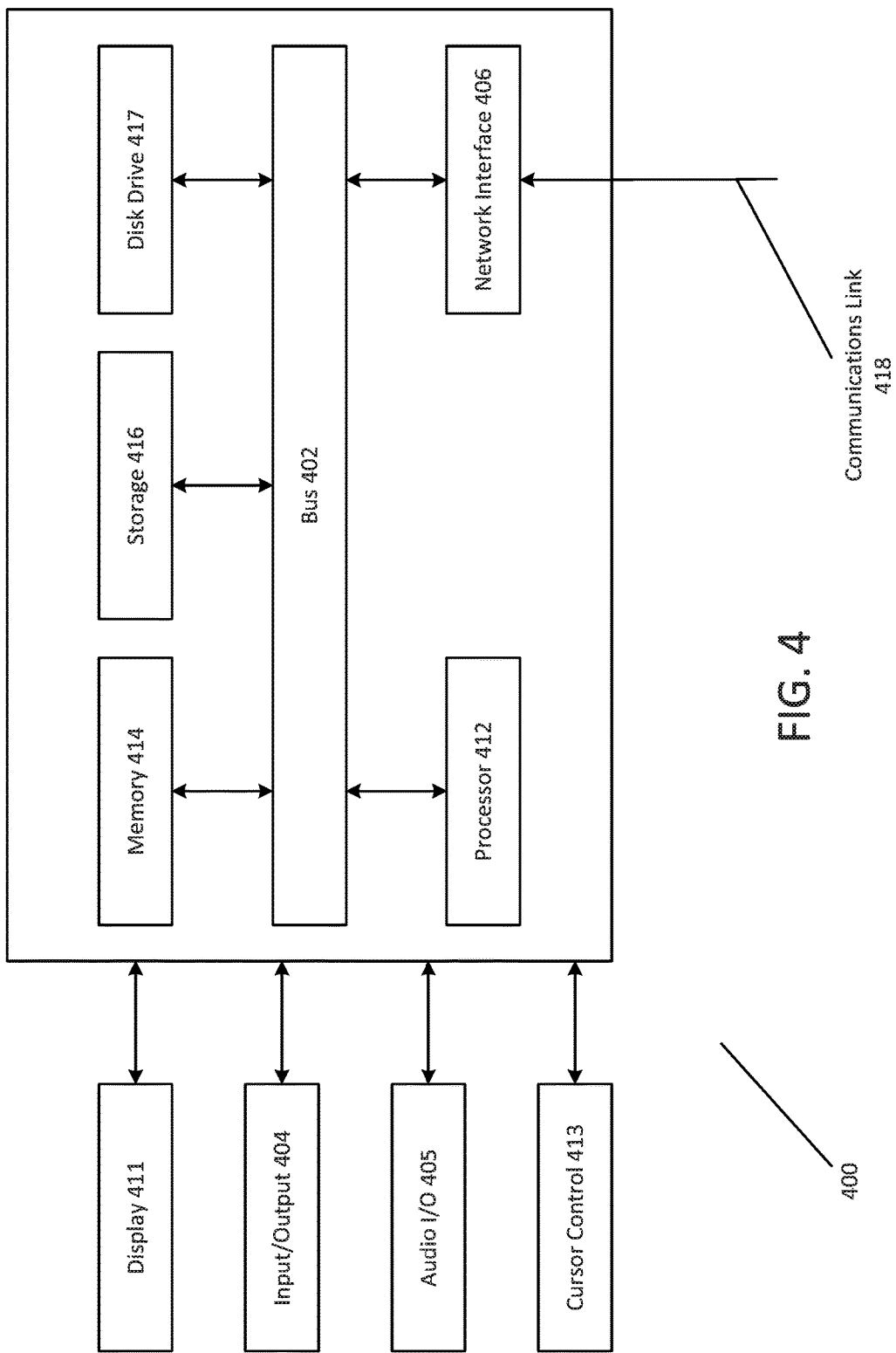
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant device, or a payment provider server via network 160. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A card device, comprising:
   a sensor; and
   one or more controllers configured to perform operations, without communication to a remote server, comprising:
   detecting, using the sensor, a reading of the card device by a scanner for a transaction;
   determining a number of readings of the card device over a time period while the card device is at a location corresponding to the transaction;
   determining a set maximum number of readings over a time period based on a wireless connection status with a mobile device managing the card device;
   selecting payment card data to emulate based on the number of readings of the card device and the set maximum number of readings; and
   enabling the card device to proceed with the transaction using the payment card data based at least on the number of readings of the card device over the time period while the card device is at the location corresponding to the transaction being below the set maximum number of readings over the time period.

2. The card device of claim 1, wherein the operations further comprise:
   detecting, using the sensor, the card device is read by a second scanner;
   determining a second number of readings of the card device by the second scanner; and
   locking the card device based at least on the second number of readings being over a predetermined number of readings.

3. The card device of claim 2, wherein the operations further comprise:
   transmitting a notification to the mobile device that indicates the locking of the card device based on the second number of readings being over the predetermined number of readings, wherein the notification is configured to cause the mobile device to display the notification.

4. The card device of claim 1, wherein the number of readings of the card device comprises a number of readings of a magnetic strip of the card device, and wherein the operations further comprise:
   detecting, using the sensor, a magnetic head of the scanner configured to sense one or more polarities of the magnetic strip, and
   wherein the reading of the card device is detected based at least on detecting the magnetic head of the scanner.

5. The card device of claim 1, wherein the operations further comprise:
   causing an electrophoretic ink display of the card device to display a status indicating the reading of the card device by the scanner is authenticated.

6. The card device of claim 1, wherein the operations further comprise:
   detecting a fingerprint input received by a fingerprint scanner of the card device, and
   wherein the enabling is based further on the fingerprint input detected.

7. The card device of claim 1, wherein the operations further comprise:
   determining, with an emulator of the card device, one or more magnetic signals of a magnetic strip,
   wherein detecting the reading of the card device by the scanner comprises detecting the one or more magnetic signals being read by the scanner; and
   wherein the number of readings is determined by the one or more magnetic signals being read by the scanner.

8. The card device of claim 1, wherein the operations further comprise:
   in response to enabling the card device to proceed with the transaction, delaying a further emulation of payment card data.

9. The card device of claim 1, wherein the operations further comprise:
   in response to a determination that the number of readings of the card device over the time period while the card device is at the location corresponding to the transaction exceed the set maximum number, locking the card device; and
   enabling the card device to proceed with the transaction based on an authentication of a credential associated with the card device.

10. A system, comprising:
    a non-transitory memory; and
    one or more hardware processors coupled to the non-transitory memory and configured to read instructions from the non-transitory memory to cause the system to perform operations, without communication to a remote server, comprising:
    receiving from a card device, based on a communication with a communication module of the card device, a number of readings associated with the card device over a time period while the card device is at a location corresponding to a transaction;
    determining, by the system managing the card device, a set maximum number of readings over a time period based on a wireless connection status with the card device;
    selecting payment card data to emulate based on the number of readings of the card device and the set maximum number of readings; and
    enabling the card device to proceed with the transaction based at least on the number of readings of the card device over the time period while the card device is at the location corresponding to the transaction being below the set maximum number of readings over the time period, wherein the card device is enabled for a reading of the card device by a scanner to proceed with the transaction.

11. The system of claim 10, wherein the communication is through near field communication (NFC), and wherein the enabling of the card device uses the NFC communication.

12. The system of claim 10, wherein the operations further comprise:
determining one or more passwords received based at least on the communication with the communication module of the card device,
wherein the enabling of the card device is further based at least on the one or more determined passwords.

13. The system of claim 10, wherein the operations further comprise:
determining an account identifier received based at least on the communication with the communication module of the card device, and
wherein the enabling of the card device is further based at least on the determined account identifier.

14. The system of claim 10, wherein the operations further comprise:
causing a light emitting display of the card device to display a status indicating that the card device is enabled to make the transaction.

15. The system of claim 10, wherein the card device comprises a magnetic strip, wherein the number of readings associated with the card device comprises a number of readings of one or more polarities of the magnetic strip, and wherein the enabling of the card device is further based at least on the number of readings of the one or more polarities of the magnetic strip.

16. A method for enabling a card device by a mobile device without communication to a remote server comprising:
receiving, by the mobile device, a number of readings of a card device by a scanner over a time period while the card device is at a location corresponding to a transaction based at least on the mobile device communicating with the card device;
determining, by the mobile device managing the card device, a set maximum number of readings over a time period based on a wireless connection status with the card device;
selecting payment card data to emulate based on the number of readings of the card device and the set maximum number of readings; and
enabling the card device to proceed with the transaction using the payment card data based at least on the number of readings of the card device by the scanner over the time period while the card device is at the location corresponding to the transaction being below the set maximum number of readings over the time period, wherein the card device is enabled for a reading of the card device by the scanner to proceed with the transaction.

17. The method of claim 16, wherein the communicating is through a Bluetooth communication, and wherein the enabling the card device uses the Bluetooth communication.

18. The method of claim 16, further comprising:
determining the card device receives a fingerprint input with an optical sensor of the card device based at least on the mobile device communicating with the card device, and
wherein the enabling the card device is further based on the fingerprint input.

19. The method of claim 16, further comprising:
causing the card device to emulate the payment card data with a magnetic strip emulator of the card device.

20. The method of claim 16, further comprising:
displaying an authentication request received from the card device; and
in response to the authentication request, determining a user input received by the mobile device, wherein the enabling the card device is further based at least on the user input.

* * * * *